United States Patent
Fan et al.

(10) Patent No.: US 12,124,402 B2
(45) Date of Patent: Oct. 22, 2024

(54) COMPUTING DEVICE AND COMPUTING SYSTEM FOR DIGITAL CURRENCY

(71) Applicant: SHENZHEN MICROBT ELECTRONICS TECHNOLOGY CO., LTD., Guangdong (CN)

(72) Inventors: Zhijun Fan, Guangdong (CN); Haifeng Guo, Guangdong (CN); Jianbo Liu, Guangdong (CN); Zuoxing Yang, Guangdong (CN)

(73) Assignee: SHENZHEN MICROBT ELECTRONICS TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 18/044,830

(22) PCT Filed: Aug. 20, 2021

(86) PCT No.: PCT/CN2021/113673
§ 371 (c)(1),
(2) Date: Mar. 10, 2023

(87) PCT Pub. No.: WO2022/052784
PCT Pub. Date: Mar. 17, 2022

(65) Prior Publication Data
US 2023/0342326 A1    Oct. 26, 2023

(30) Foreign Application Priority Data
Sep. 11, 2020 (CN) .......................... 202010955023.3

(51) Int. Cl.
*G06F 15/16* (2006.01)
*G06Q 20/06* (2012.01)

(52) U.S. Cl.
CPC .......... *G06F 15/16* (2013.01); *G06Q 20/065* (2013.01); *G06Q 2220/00* (2013.01)

(58) Field of Classification Search
CPC ... G06F 15/16; G06F 13/4282; G06Q 20/065; G06Q 2220/00
See application file for complete search history.

(56) References Cited

U.S. PATENT DOCUMENTS

| | | | |
|---|---|---|---|
| 5,717,943 A | 2/1998 | Barker et al. | |
| 6,134,240 A | 10/2000 | Voloshin | |

(Continued)

FOREIGN PATENT DOCUMENTS

| | | |
|---|---|---|
| CA | 3175824 A1 | 10/2021 |
| CN | 100501634 C | 6/2009 |

(Continued)

OTHER PUBLICATIONS

International Search Report and Written Opinion issued Nov. 19, 2021 in International Patent Application PCT/CN2021/113673.

(Continued)

*Primary Examiner* — Cheikh T Ndiaye
(74) *Attorney, Agent, or Firm* — Venable LLP

(57) ABSTRACT

A computing device and a computing system for digital currency are disclosed. The computing system comprises: computing devices (comprising first and second computing devices) each comprising two ports; and a signal transmission path connecting the computing devices in series. Each computing device is connected to the signal transmission path via the two ports. The first computing device is configured to receive, from the signal transmission path through one of the two ports, a signal specific to an address of the first computing device to a local storage device thereof. The second computing device is configured to receive, from the signal transmission path through one of the two ports, a signal to a local storage device thereof, and forward the signal, which is not specific to an address of the second (Continued)

computing device, or an adjusted version of the signal to the signal transmission path through one of the ports.

19 Claims, 4 Drawing Sheets

(56) References Cited

U.S. PATENT DOCUMENTS

| | | | |
|---|---|---|---|
| 6,256,324 B1 | 7/2001 | Voloshin | |
| 8,359,479 B2 | 1/2013 | Grinchuk et al. | |
| 2004/0019704 A1 | 1/2004 | Sano et al. | |
| 2008/0140899 A1* | 6/2008 | Oh | G11C 8/18 |
| | | | 710/300 |
| 2008/0301344 A1* | 12/2008 | Hsieh | G06F 13/4282 |
| | | | 710/110 |
| 2009/0039915 A1* | 2/2009 | Ruckerbauer | G11C 5/04 |
| | | | 326/38 |
| 2009/0144471 A1* | 6/2009 | Lin | G06F 13/4252 |
| | | | 710/110 |
| 2011/0228783 A1 | 9/2011 | Flynn et al. | |
| 2012/0188832 A1 | 7/2012 | Vogt | |
| 2015/0248371 A1 | 9/2015 | Zheng | |
| 2016/0055114 A1 | 2/2016 | Freiwald et al. | |
| 2016/0330031 A1* | 11/2016 | Drego | H04L 9/3239 |
| 2019/0066067 A1 | 2/2019 | O'Brien et al. | |
| 2022/0027266 A1* | 1/2022 | Guardiani | G06F 13/36 |
| 2023/0244630 A1 | 8/2023 | Guo et al. | |

FOREIGN PATENT DOCUMENTS

| | | |
|---|---|---|
| CN | 105868148 A | 8/2016 |
| CN | 105900080 A | 8/2016 |
| CN | 206498414 U | 9/2017 |
| CN | 108304338 A | 7/2018 |
| CN | 108647180 A | 10/2018 |
| CN | 109359073 A | 2/2019 |
| CN | 208477523 U | 2/2019 |
| CN | 110770712 A | 2/2020 |
| CN | 111339024 A | 6/2020 |
| CN | 112084131 A | 12/2020 |
| TW | 201214128 A | 4/2012 |
| TW | 202029067 A | 8/2020 |
| WO | 2011113661 A2 | 9/2011 |
| WO | 2019232840 A1 | 12/2019 |
| WO | 2020149953 A1 | 7/2020 |

OTHER PUBLICATIONS

First Office Action issued in Chinese Application No. 202010955023.3.
Second Office Action issued in Chinese Application No. 202010955023.3.
First Office Action issued in Taiwanese Application No. 110130821.
First Office Action issued on Dec. 8, 2024 in Taiwan application No. 110130821.

* cited by examiner

COMPUTING DEVICE AND COMPUTING SYSTEM FOR DIGITAL CURRENCY

CROSS-REFERENCE TO RELATED APPLICATIONS

The present application is a U.S. National Phase Application of PCT/CN2021/113673, filed Aug. 20, 2021, which claims the benefit and priority of Chinese Patent Application No. 202010955023.3 filed on Sep. 11, 2020, the entire content of which is hereby incorporated by reference in its entirety.

TECHNICAL FIELD

The present disclosure relates to a computing device and a computing system for digital currency (for example, Bitcoin, Litecoin, Ethereum, or the other digital currencies).

BACKGROUND

In recent years, digital currency is attracting increasing attentions. An improved computing device and computing system for digital currency are required in related fields.

SUMMARY

According to an aspect of the present disclosure, a computing system for digital currency is provided that comprises: a plurality of computing devices each comprising a first port and a second port, the plurality of computing devices comprising a first computing device and a second computing device; and a signal transmission path connecting the plurality of computing devices in series, wherein each of the computing devices is respectively connected to the signal transmission path via the first port and the second port thereof, wherein the first computing device is configured to receive, from the signal transmission path through one of the first port and the second port, a signal specific to an address of the first computing device to a local storage device thereof, and not to receive a signal not specific to the address of the first computing device; and the second computing device is configured to receive, from the signal transmission path through one of the first port and the second port a signal to a local storage device thereof, and forward the signal, which is not specific to an address of the second computing device, or an adjusted version of the signal to the signal transmission path through one of the first port and the second port.

According to another aspect of the present disclosure, a computing device for digital currency is provided that comprises: a first port and a second port; and a communication module respectively connected to an external signal transmission path via the first port and the second port, wherein the computing device comprises a first operating mode and a second operating mode, in the first operating mode, the computing device is configured to receive, from the signal transmission path through one of the first port and the second port, a signal specific to an address of the computing device to a local storage device, and not to receive a signal not specific to the address of the computing device; and in the second operating mode, the computing device is configured to receive, from the signal transmission path through one of the first port and the second port to the local storage device, and forward the signal not specific to the address of the computing device or a adjusted version of the signal to the signal transmission path through one of the first port and the second port.

Through the following detailed description of exemplary embodiments of the present disclosure with reference to the accompanying drawings, other features and advantages of the present disclosure will become apparent.

BRIEF DESCRIPTION OF THE DRAWINGS

The accompanying drawings constituting a part of the specification illustrate the embodiments of the present disclosure, and are used to explain the principles of the present disclosure together with the specification.

With reference to the accompanying drawings, the present disclosure can be more clearly understood according to the following detailed descriptions, where.

Figure 1:
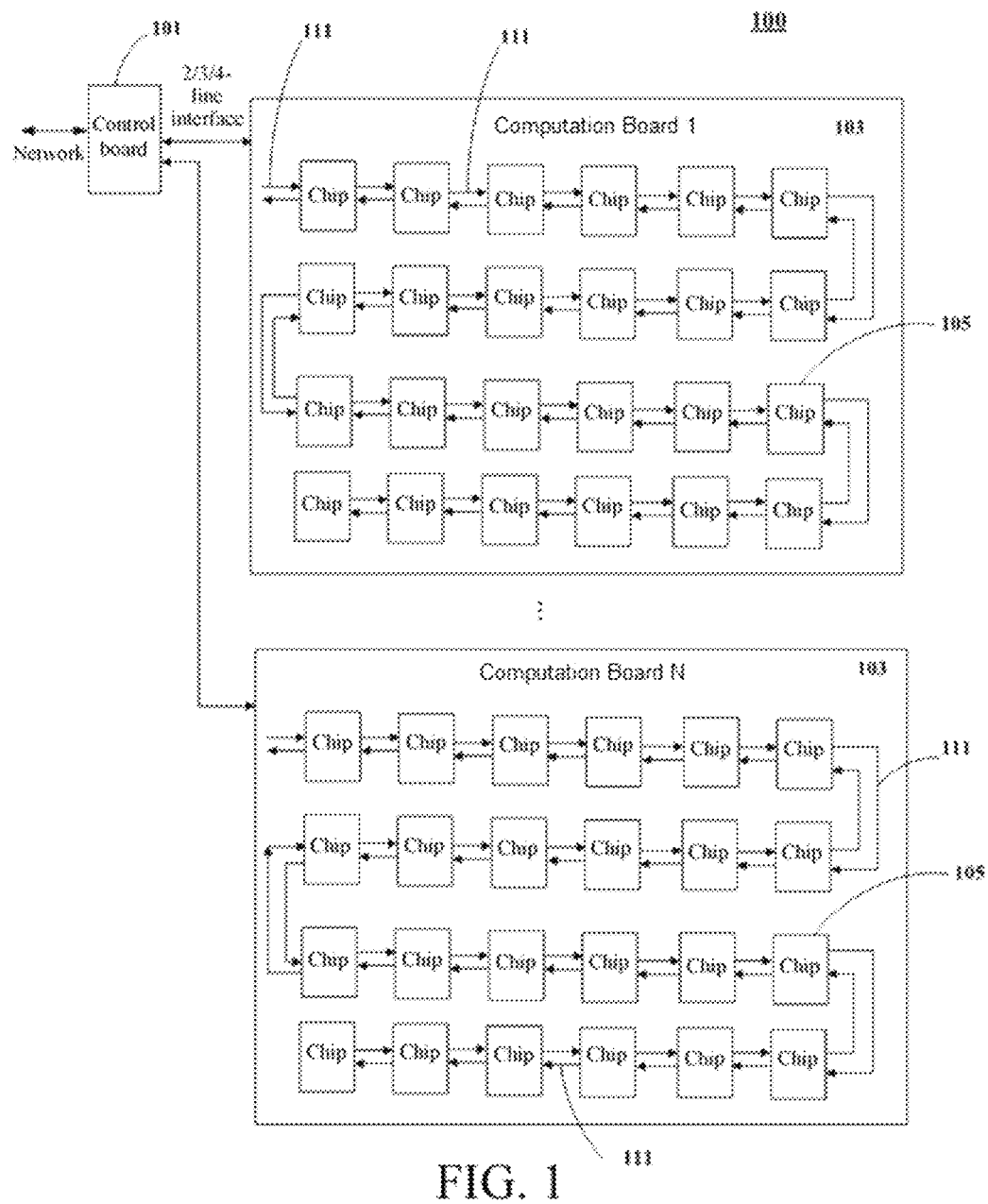
FIG. 1 shows a computing system for digital currency.

It is to be noted that, in the embodiments illustrated in the following, sometimes the same reference numeral is used in different accompanying drawings to indicate the same parts or parts with the same function, and repetitive descriptions thereof are omitted. In this specification, like reference signs or letters are used to indicate like items. Therefore, once an item is defined in one accompanying drawing, the item does not need to be further discussed in the subsequent accompanying drawings.

For ease of understanding, locations, sizes, ranges, and the like of structure(s) shown in the accompanying drawings sometimes do not represent actual locations, sizes, ranges, and the like. Therefore, the disclosed inventions are not limited to the locations, sizes, ranges, and the like disclosed in the accompanying drawings and the like.

DETAILED DESCRIPTION OF EXEMPLARY EMBODIMENTS

Various exemplary embodiments of the present disclosure are described herein below in detail with reference to the accompanying drawings. It is to be noted that unless otherwise specified, the relative arrangements, the numerical expressions, and values of the components and steps described in the embodiments are not intended to limit the scope of the present disclosure. In addition, technologies, methods, and devices known to a person of ordinary skill in the art may be not discussed in detail, but when applicable, these technologies, methods, and devices shall be regarded as a part of the specification.

It is to be noted that the following description of at least one exemplary embodiment is merely illustrative and is not intended to limit the present disclosure and application or use of the present disclosure. It should also be noted that any of the exemplary embodiments described herein do not necessarily indicate that they are preferred or advantageous over other embodiments. The present disclosure is not limited by any of the theories expressed or implied in the parts of TECHNICAL FIELD, BACKGROUND, SUMMARY, or DETAILED DESCRIPTION given herein.

In addition, certain terms may be used in the following description for reference purpose only, and are thus not intended to be limiting. For example, the numerical terms, such as the terms "first", "second", and the like referring to structures or components do not imply any order or sequence unless the context expressly indicates otherwise.

It should be further noted that the term "comprise" or "include", when used in this specification, specifies the presence of stated features, integers, steps, operations, units, and/or components, but do not preclude the presence or addition of one or more other features, integers, steps, operations, units, components, and/or groups thereof.

FIG. 1 shows a computing system for digital currency.

As shown in FIG. 1, the computing system 100 includes a control board 101 and a computation board 103. The control board 101 may connect to and control a plurality of hash boards 103, for example, a hash board 1 to a hash board N shown in the figure. A plurality of operation chips (also referred to as computation chips) 105 may be provided on the hash board 103. The chips 105 may be connected to each other by a signal transmission path 111. The signal transmission path may be a bus.

Preferably, the chips 105 may be the same as each other. For example, two chips 105 may be configured to perform the same operation on the same received signal. Alternatively, two chips 105 may be configured to perform calculation on respective received signals based on the same algorithm. Alternatively, two chips 105 may be configured to perform calculation on respective received signals based on the same algorithm for virtual currency.

A computing work is broadcast through the entire network. Communications are required between the control board and the hash boards, between the hash boards and the computation chips, and between the computation chips. The control board may obtain a broadcast calculation work via the network. The control board sends specific calculation work(s) to the hash boards/computation chips, and the hash boards/computation chips feed back calculation results to the control board. The broadcast calculation work is not directly equivalent to the specific calculation work(s). The control board may usually be provided with an operation module (software calculation or hardware acceleration) to convert a broadcast work into specific calculation work(s).

The control board may deliver the work that needs to be calculated to a computation chip, for example, a computation chip that is directly connected or indirectly connected to the control board. The computation chip may feed back a calculation result to the control board.

In some implementations, communications may be performed between the control board and the hash boards (or the chips on the hash boards) and between chips through a serial interface or a serial communication protocol. For example, communication may be performed by using protocols such as I2C, SPI, UART, or the like.

I2C (Inter-Integrated Circuit) Communication Protocol:

The I2C communication protocol is a kind of serial bus. The I2C protocol (or an interface following the protocol) uses two lines for transmission. I2C only requires two bus lines, namely, a serial data bus SDA and a serial clock bus SCL. There is no fixed master-slave relationship between communication parties which use the I2C protocol to communicate. Different addresses need to be separately assigned to the control board and the chips. The control board may directly make a broadcast to all computation chips. The computation chips may report information to the control board.

SPI (Serial Peripheral Interface) Communication Protocol:

The introductory description of the SPI interface communication protocol may be obtained from the following URL listed below:

http://www.openpcba.com/web/contents/
get?id=3750&tid=9

The SPI protocol is mainly to communicate in a master-slave mode. In this mode, there are only one master and one or more slaves. Four lines are used in standard SPI communication, and are respectively, SSEL (chip select, also referred to as SCS), SCLK (clock, also referred to as SCK), MOSI (Master Output/Slave Input), and MISO (Master Input/Slave Output).

SSEL: Slave device chip-select enable signal. If the slave device is enabled at a low level, the slave device is selected after a corresponding pin is pulled down. The master communicates with the selected slave device.

SCLK: Clock signal. SCLK is generated by the master, and is somewhat similar to SCL in I2C communication.

MOSI: Channel for the master to transmit an instruction or data to slave device(s).

MISO: Channel for the master to read status or data of slave device(s).

In some cases, a three-line SPI or a two-line SPI may be used for communication.

Communication parties using the I2C protocol to communicate have an asymmetric or unequal relationship. Generally, only the control board can initiate communication and queries. For example, the control board may initiate a broadcast.

Universal Synchronous/Asynchronous Receiver/Transmitter (UART) communication protocol:

The introductory description of the UART communication protocol may be obtained from the following URL listed below:

https://blog.csdn.net/CLL_caicai/article/details/
107460075

The UART communication protocol is to communicate in a full-duplex serial communication mode, and an interface of the protocol usually includes a data transmitter, a data receiver, and a clock generator.

The UART uses two data lines: TX is a data transmission line in which data is serially transmitted from the least significant bit to the most significant bit; and TR is a data reception line in which data is serially received from the least significant bit to the most significant bit.

For communication parties with the UART protocol, any party can initiate communication. The control board may make a broadcast to all the chips. The chips may transmit and receive information. Between the control board and the hash board (or chip(s) on the hash board) and between the chips, asynchronous communication is employed, and signal line is monitored.

The chips on the hash boards may be connected to each other in series and play the same roles. However, as the number of chips increases, the signal transferred on a serial bus, for example, a broadcast signal transmitted by the control board, has a poor communication signal quality because of excessive load on the serial bus, and a low transmission rate/efficiency.

Figure 2:
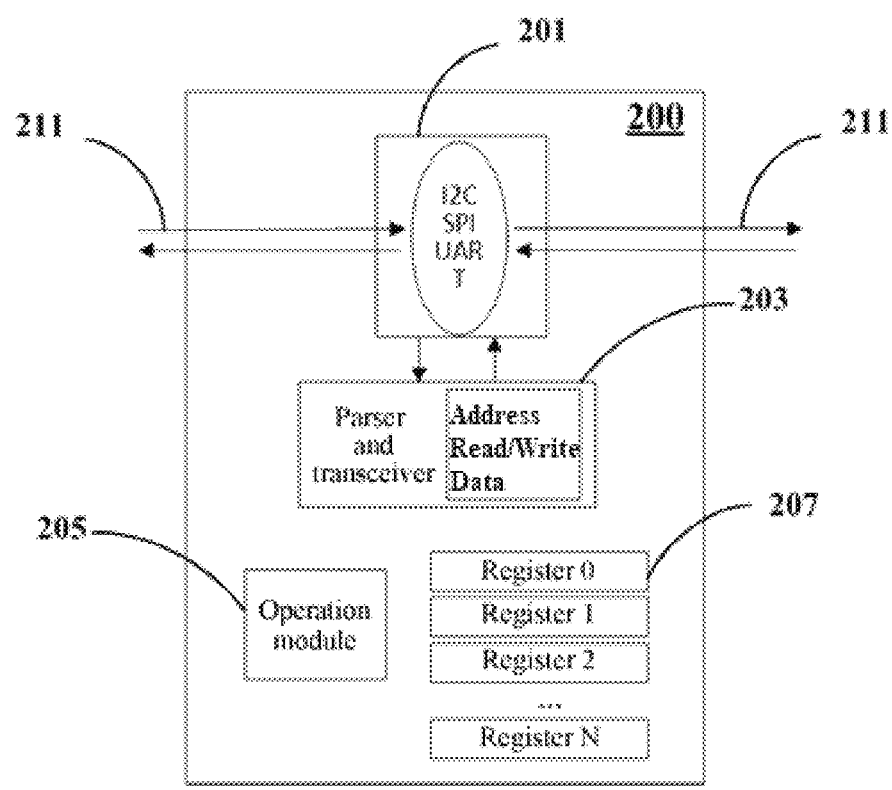
FIG. 2 is a schematic block diagram illustrating a computation chip according to an embodiment of the present disclosure.

FIG. 2 is a schematic block diagram of a computation chip according to an embodiment of the present disclosure.

As shown in FIG. 2, the chip 200 uses a serial communication mode, for example, one of I2C, SPI, and UART.

The chip 200 may include a communication module 201, connected to a serial communication bus 211, for example, one of I2C, SPI, and UART. Signals, for example but not limited to, an instruction, can be received from the bus 211, and signals can be transmitted to the bus through the communication module 201. The communication module 201 may include one or more ports. The port may be implemented as an I2C interface, an SPI interface, a UART interface, or the like.

The chip 200 may further include a parser and transceiver module 203, connected to the communication module 201, to parse the received signal (for example, instruction). In some examples, the instruction may include one or more of an address, a read/write instruction, and data. However, the present disclosure is not limited thereto. The parser and transceiver module 203 may parse the instruction to determine whether a target address of the instruction matches a related address or address range, to determine whether the instruction is specific to the chip. If the instruction is specific to the chip, the module 203 receives the instruction and adds the instruction to a local position, for example, a storage device 207 of the chip.

In the example shown in FIG. 2, registers 0 to N (N is a positive integer) are shown, and are used as the storage device 207. The present disclosure is not limited thereto.

If the instruction is not specific to the chip 200, for example, if the target address of the instruction does not match the address or the address range of the chip, the parser and transceiver module does not receive the instruction to a local position. The communication module 201 instead directly transmits the instruction, for example, to a next chip.

The chip 200 may further include an operation module 205 configured to perform an operation based on the received signal. For example, but not limited thereto, the operation module may perform a HASH calculation based on the data in the received instruction.

According to this embodiment, the signal transmission has a short interaction time and a short delay, and the signal from the control board may directly reach each chip. However, the disadvantage is that signal load is heavy, and if signal transmission passes a long distance (for example, passes multiple stages of chips), the shape thereof may be distorted. The stability and rate of the transmission may be reduced. Therefore, such an embodiment is applicable to the case in which there are a relatively small number of chips and may have significant advantages in such a case.

Figure 3:
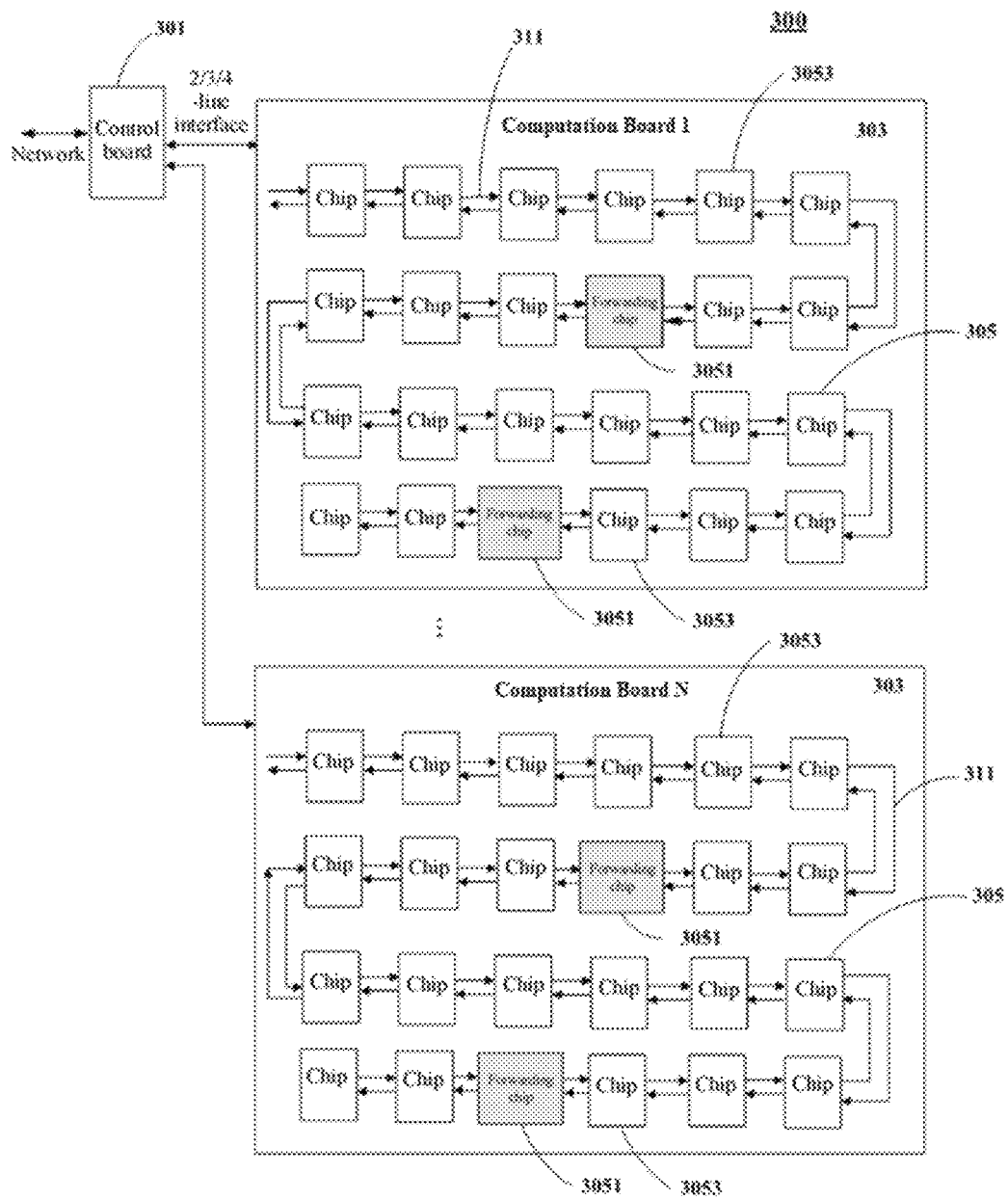
FIG. 3 is an exemplary block diagram illustrating a computing system according to another embodiment of the present disclosure.

FIG. 3 is an exemplary block diagram of a computing system according to another embodiment of the present disclosure.

As shown in FIG. 3, the computing system 300 includes a control board 301 and a hash board 303. The control board 301 may be connected to and control a plurality of hash boards 303, for example, a hash board 1 to a hash board N as shown in the figure. A plurality of operation chips (also referred to as computation chips) 305 may be provided on the hash board 303. The chips 305 may be connected to each other through a signal transmission path 311. The signal transmission path 311 may be a serial bus, for example, I2C, SPI, UART, or the like.

In this embodiment, some of the computation chips 305 are configured as forwarding chips, for example, forwarding chips 3051 shown in the figure. Other chips are labeled with 3053. Each forwarding chip 3051 may be configured to receive a signal from the signal transmission path 311 to the local storage device, and forward the signal which is not specific to an address of the forwarding chip or an adjusted version of the signal to the signal transmission path 11. For example, the forwarding chip 3051 may completely receive and store a signal from the control board through the signal transmission path and then transmit the signal downstream. On the other hand, the forwarding chip 3051 may further completely receive and store a signal transmitted from a downstream chip and then transmit the signal upstream (the direction to the control board).

Each of the other chips 3053 may be configured to receive, through the signal transmission path 311, a signal, which is specific to the address of the chip, to the local storage device, and not to receive a signal which is not specific to the address of the chip, as discussed above.

In some embodiments, the chip 3053 and the chip 3051 may include the same components, but parts of the same components of the chip 3053 and the chip 3051 may be differently configured, which will be described in further detail below.

The signal that passes through the forwarding chip is restored and transmitted and optionally shaped additionally, the quality of the signal may be improved or restored.

In some implementations, the chips 305 on the hash board have the same structure, and some chips may be selectively configured as forwarding chips, and other chips may be configured to not have the forwarding function. For example, the chips may be configured by using a software of a Bitcoin miner so that a chip is configured as a forwarding chip in every certain quantity of chips.

With the chips designed to be configurable, signal quality can be ensured, and the cost in the real-time performance of signal transmission may be ignorable, and the delay can be short. In this way, there is not quantity limitation in the expansion of chips on the hash board. The hardware cost for this is restrained and not considerable.

Figure 4:
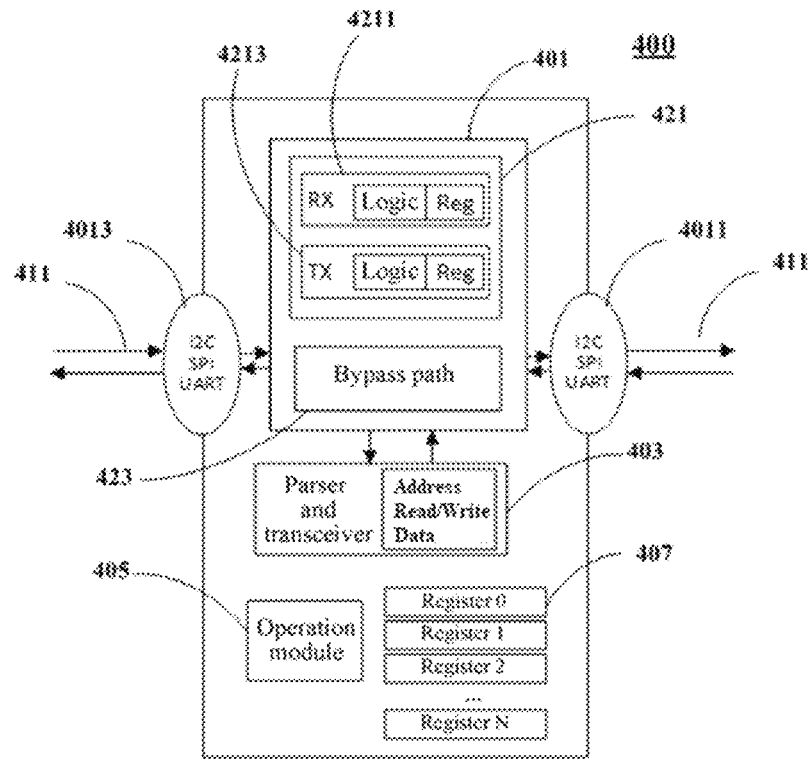
FIG. 4 is a schematic block diagram illustrating a computation chip according to an embodiment of the present disclosure.

FIG. 4 is a schematic block diagram of a computation chip according to an embodiment of the present disclosure.

As shown in FIG. 4, the chip 400 includes two ports 4011 and 4013, configured to be connected to a serial bus 411. The chip 400 is configured to receive a signal from the signal transmission path 411 through one of the first port (4011 or 4013) and the second port (4013 or 4011) to a local storage device (for example, a register), and forward the signal which is not specific to the address of the chip or an adjusted version of the signal to the signal transmission path through one of the first port and the second port.

In some embodiments, the chip 400 may be further configured to forward the signal which is not specific to the address of the chip or the adjusted version of the signal to the signal transmission path through the other of the first port and the second port.

In a more specific embodiment, as shown in FIG. 4, the chip 400 may include a communication module 401. The communication module 401 may be respectively connected to a signal transmission path 411 via a first port and a second port. The communication module 401 may include a forwarding module 421. The forwarding module 421 may include: a receiving (RX) module 4211 configured to receive a signal from the signal transmission path 411 through the first port or the second port to a local position, for example, a register 4214; and a transmitting (TX) module 4213 configured to retrieve the signal stored at the local position (for example, the register) or an adjusted version of the signal, and transmit the signal or the adjusted version of the signal to the signal transmission path 411 through the second port or the first port.

In some embodiments, as shown in FIG. 4, the receiving module 4211 may include: a register (a first register, Reg); and a receiving logic circuit configured to receive a signal from the signal transmission path through one of the first port and the second port to the first register. The transmitting module 4213 may include: a register (a second register, Reg) configured to retrieve and store the signal stored in the first register or the adjusted version of the signal; and a transmitting logic circuit configured to transmit the signal stored in the second register to the signal transmission path through one of the first port and the second port. In an alternate embodiment, the receiving module 4211 and the transmitting module 4213 may share the same register.

The signal transmitted on the signal transmission path is received to a local position, and is re-transmitted to the signal transmission path. Therefore, the quality of the signal is improved. It should be noted that although not shown in the figure, the communication module 401 or the forwarding module 421 of the communication module may further include an optional signal processing module if necessary, to perform appropriate processing (e.g., shaping) on the signal.

In some other embodiments, the communication module 401 may further include a bypass path 423. The bypass path 423 is configured to bypass a signal received from the signal transmission path through one of the first port and the second port to the other of the first port and the second port to keep the signal from passing through the forwarding module 421. The bypass path 423 and the forwarding module 423 may be configured to operate alternately.

It should be noted that the chip 400 may have different operating modes. In a first operating mode, the bypass path operates and the forwarding module does not operate. In the first operating mode, the chip may be configured to receive, from the signal transmission path through one of the first port and the second port, a signal which is specific to the address of the chip to a local storage device, and not to receive a signal which is not specific to the address of the chip.

In the second operating mode, the forwarding module operates and the bypass path does not operate. In the second operating mode, the chip may be configured to receive a signal from the signal transmission path through one of the first port and the second port to the local storage device, and forward the signal which is not specific to the address of the chip or an adjusted version of the signal to the signal transmission path through one of the first port and the second port.

In addition, as discussed above, some of the chips in the computing system may be configured as forwarding chips. That is, the chips in the computing system may all have the structure as shown with the chip 400. Through different configurations, part of the chips may be configured so that the forwarding modules operate but the bypass paths do not operate, and another part of the chips may be configured so that the bypass paths operate but the forwarding modules do not operate.

In this way, the computing system may be flexibly configured as required, and the signal quality can be conveniently and flexibly improved in a targeted manner as needed.

In addition, the chip 400 may further include a parser and transceiver module 403, an operation module 405, and a storage device 407. The content described above for FIG. 2 is also applicable here, and thus repeated descriptions are omitted.

Therefore, it should be further noted that a computing system for digital currency is provided according to the present disclosure. The computing system may comprise: a plurality of computing devices each including a first port and a second port, and the plurality of computing devices including a first computing device and a second computing device; and a signal transmission path connecting the plurality of computing devices in series, where each computing device is respectively connected to the signal transmission path via the first port and the second port thereof. The first computing device is configured to receive, from the signal transmission path through one of the first port and the second port, a signal, which is specific to an address of the first computing device, to a local storage device, and not to receive a signal which is not specific to the address of the first computing device. The second computing device is configured to receive a signal from the signal transmission path through one of the first port and the second port to a local storage device, and forward the signal which is not specific to an address of the second computing device or an adjusted version of the signal to the signal transmission path through one of the first port and the second port.

The computing device may be a chip as described in any embodiments of the present disclosure. Although the present disclosure is described with a chip (and a hash board including or carrying a chip or the like) as an example of the computing device, it should be further noted the present disclosure shall not be limited thereto. A person skilled in the art can easily apply the principles of the present disclosure to other cases as required according to the teachings of the present disclosure. For example, but not limited to, parts or all of the teachings of the present disclosure can be readily applied to cores (and chips having the cores).

Figure 5:
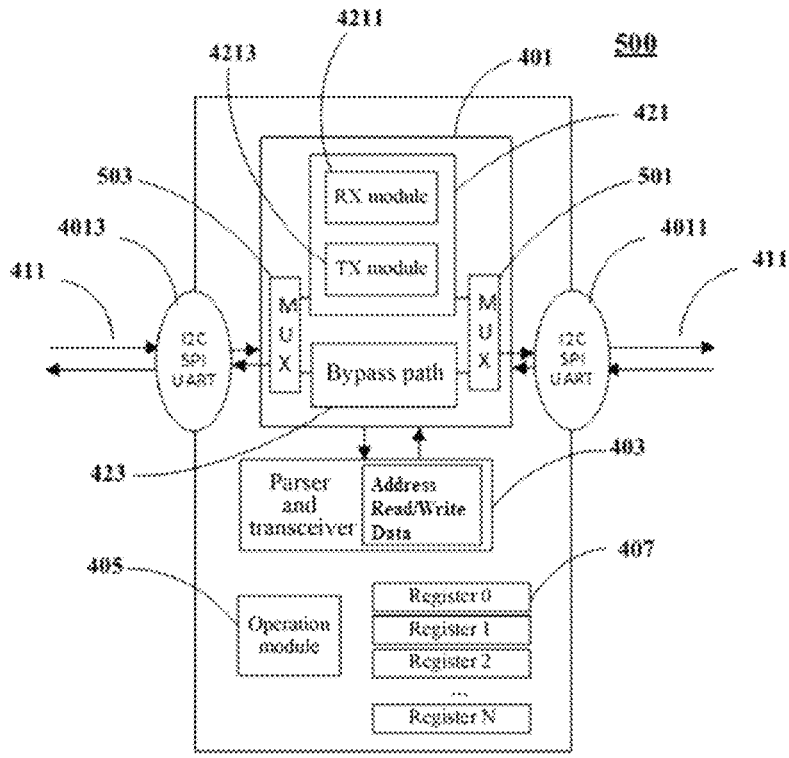
FIG. 5 is a schematic block diagram illustrating a computation chip according to another embodiment of the present disclosure.

FIG. 5 is a schematic block diagram of a computation chip according to another embodiment of the present disclosure.

The same components in the embodiment shown in FIG. 5 are labeled with the same reference numerals as in the embodiment in FIG. 4, and the descriptions above in connection with FIG. 4 may be applied likewise or adaptively to FIG. 5, so that repeated description thereof is omitted herein. Compared with FIG. 4, FIG. 5 additionally shows multiplexers MUX 501 and 503.

As shown in FIG. 5, the forwarding module 401 may further include: a first multiplexer (501 or 503) including a first input, a second input, and an output, wherein the first input is connected to the transmitting module, the second input is connected to the bypass path, and the output is connected to the second port. The forwarding module 401 may further include a second multiplexer (503 or 501) including a first input, a second input, and an output, wherein the first input is connected to the transmitting module, the second input is connected to the bypass path, and the output is connected to the first port. Each of the first multiplexer and the second multiplexer may provide the first input or the second input to the output according to a respective control signal.

It should be further noted that the following items are further conceived according to the present disclosure.

Item 1: A computing system for digital currency, comprising: a plurality of computing devices each comprising a first port and a second port, the plurality of computing devices comprising a first computing device and a second computing device; and a signal transmission path connecting the plurality of computing devices in series, wherein each of the computing devices is respectively connected to the signal transmission path via the first port and the second port thereof, wherein the first computing device is configured to receive, from the signal transmission path through one of the first port and the second port, a signal specific to an address of the first computing device to a local storage device thereof, and not to receive a signal not specific to the address of the first computing device; and the second computing device is configured to receive, from the signal transmission path through one of the first port and the second port a signal to a local storage device thereof, and forward the signal, which is not specific to an address of the second computing device, or an adjusted version of the signal to the signal transmission path through one of the first port and the second port.

Item 2. The computing system according to item 1, wherein the second computing device is further configured to forward the signal which is not specific to the address of the second computing device or the adjusted version of the signal to the signal transmission path through the other of the first port and the second port.

Item 3. The computing system according to item 1, wherein the signal comprises an address, a read/write instruction, and data, wherein the first computing device and the second computing device are further configured to perform an operation on the data included in the received signal based on a same algorithm.

Item 4. The computing system according to item 1, wherein the first computing device and the second computing device comprise same components, and parts of the same components of the first computing device and the second computing device are differently configured.

Item 5. The computing system according to any one of items 1 to 4, wherein the second computing device comprises a communication module, and the communication module is respectively connected to the signal transmission path via the first port and the second port, the communication module comprises a forwarding module, and the forwarding module comprises: a receiving module configured to receive the signal from the signal transmission path through the first port or the second port to a first register; and a transmitting module configured to acquire a signal stored in the first register or an adjusted version of the signal, and transmit the signal or the adjusted version of the signal to the signal transmission path through the second port or the first port.

Item 6. The computing system according to item 5, wherein the communication module further comprises a bypass path, and the bypass path is configured to: bypass a signal received from the signal transmission path through one of the first port and the second port to the other of the first port and the second port without passing through the forwarding module.

Item 7. The computing system according to item 5, wherein the receiving module comprises: a receiving logic circuit configured to receive a signal from the signal transmission path through one of the first port and the second port to the first register; and the first register; and the transmitting module comprises: a second register configured to acquire and store the signal stored in the first register or the adjusted version of the signal stored in the first register; and a transmitting logic circuit configured to transmit the signal stored in the second register to the signal transmission path through one of the first port and the second port.

Item 8. The computing system according to item 6, wherein the communication module further comprises: a first multiplexer comprising a first input, a second input, and an output, wherein the first input is connected to the transmitting module, the second input is connected to the bypass path, and the output is connected to the second port; and a second multiplexer comprising a first input, a second input, and an output, wherein the first input is connected to the transmitting module, the second input is connected to the bypass path, and the output is connected to the first port.

Item 9. The computing system according to any one of items 1 to 4, wherein each of the first computing device and the second computing device comprises a communication module, the communication module is respectively connected to the signal transmission path via the first port and the second port, and the communication module comprises: a forwarding module comprising: a receiving module configured to receive a signal from the signal transmission path through the first port or the second port to a first register; and a transmitting module configured to acquire a signal stored in the first register or an adjusted version of the signal stored in the first register, and transmit the signal or the adjusted version of the signal to the signal transmission path through the second port or the first port; and a bypass path configured to: bypass a signal received from the signal transmission path through one of the first port and the second port to the other of the first port and the second port without passing through the forwarding module, wherein the first computing device is configured to cause the bypass path of the first computing device to operate and the forwarding module of the first computing device not to operate, and the second computing device is configured to selectively cause the bypass path of the second computing device or the forwarding module of the second computing device to operate.

Item 10. The computing system according to any one of items 1 to 9, wherein each of the first port and the second port comprises one of the following: a UART interface, an I2C interface, and an SPI interface.

Item 11. The computing system according to item 9 or 5, wherein the first computing device further comprises: a first parser and transceiver module connected to the communication module and configured to receive a signal from the communication module, parse the received signal, and transmit a signal to the communication module; a first operation module configured to perform an operation based on the received signal; and a first storage device configured to at least store the received signal and/or an output signal to be transmitted; and the second computing device further comprises: a second parser and transceiver module connected to the communication module, and configured to receive a signal from the communication module, parse the received signal, and transmit a signal to the communication module; a second operation module configured to perform an operation based on the received signal; and a second storage device configured to at least store the received signal and/or an output signal to be transmitted, wherein the first operation module and the second operation module perform an operation based on the same algorithm.

Item 12. The computing system according to item 1, wherein the first computing device and the second computing device are chips or cores.

Item 13. A computing device for digital currency, comprising: a first port and a second port; and a communication module respectively connected to an external signal transmission path via the first port and the second port, wherein the computing device comprises a first operating mode and a second operating mode, in the first operating mode, the computing device is configured to receive, from the signal transmission path through one of the first port and the second port, a signal specific to an address of the computing device to a local storage device, and not to receive a signal not specific to the address of the computing device; and in the second operating mode, the computing device is configured to receive a signal, from the signal transmission path through one of the first port and the second port to the local storage device, and forward the signal not specific to the address of the computing device or an adjusted version of the signal to the signal transmission path through one of the first port and the second port.

Item 14. The computing device according to item 13, wherein the communication module comprises: a forwarding module, comprising: a receiving module configured to receive a signal from the signal transmission path through the first port or the second port to a first register; and a transmitting module configured to acquire a signal stored in the first register or a adjusted version of the signal stored in the first register, and transmit the signal or the adjusted version of the signal to the signal transmission path through the second port or the first port; and a bypass path configured to: bypass a signal received from the signal transmission path through one of the first port and the second port to the other of the first port and the second port without passing through the forwarding module, wherein in the first operating mode, the bypass path operates and the forwarding module does not operate, and in the second operating mode, the forwarding module operates and the bypass path does not operate.

Item 15. The computing device according to item 13, wherein the computing device is further configured to forward the signal not specific to the address of the computing device or the adjusted version of the signal to the signal transmission path through the other of the first port and the second port.

Item 16. The computing device according to item 13, wherein the signal comprises an address, a read/write instruction, and data, wherein the computing device is configured to perform an operation on data included in the received signal based on an algorithm for digital currency.

Item 17. The computing device according to item 14, wherein the receiving module comprises: a receiving logic circuit configured to receive a signal from the signal transmission path through one of the first port and the second port to the first register; and the first register; and the transmitting module comprises: a second register configured to acquire and store the signal stored in the first register or the adjusted version of the signal stored in the first register; and a transmitting logic circuit configured to transmit the signal stored in the second register to the signal transmission path through one of the first port and the second port.

Item 18. The computing device according to item 17, wherein the communication module further comprises: a first multiplexer comprising a first input, a second input, and an output, wherein the first input is connected to the transmitting module, the second input is connected to the bypass path, and the output is connected to the second port; and a second multiplexer comprising a first input, a second input, and an output, wherein the first input is connected to the transmitting module, the second input is connected to the bypass path, and the output is connected to the first port.

Item 19. The computing device according to any one of items 13 to 17, wherein each of the first port and the second port comprises one of the following: a UART interface, an I2C interface, and an SPI interface.

Item 20. The computing device according to any one of items 13 to 18, further comprising: a parser and transceiver module connected to the communication module and configured to receive a signal from the communication module, parse the received signal, and transmit a signal to the communication module; an operation module configured to perform an operation based on the received signal; and a storage device configured to at least store the received signal and/or an output signal to be transmitted.

Item 21. The computing device according to any one of items 13 to 18, wherein the computing device comprises a chip or a core.

Item 22. The computing device according to any one of items 13 to 18, wherein the digital currency comprises any one of the following: Bitcoin, Litecoin, and Ethereum.

Those skilled in the art would appreciate that the boundaries between the operations (or steps) described in the above embodiments are merely illustrative. Multiple operations may be combined into a single operation, a single operation may be distributed among additional operations, and the operations may be performed at least partially overlapping in time. Further, alternative embodiments may include multiple instances of a particular operation, and the order of operations may be varied in various other embodiments. However, other modifications, changes, and replacements may also be possible. Therefore, the specification and drawings should be regarded as illustrative rather than limitative.

While some particular embodiments of the present disclosure have been described in detail by way of examples, it should be noted by those skilled in the art that the above examples are merely for illustrative purposes and are not intended to limit the scope of the present disclosure. The embodiments disclosed herein may be combined in any manners without departing from the spirit and scope of the present disclosure. It is to be further noted by those skilled in the art that various modifications may be made to the embodiments without departing from the scope and spirit of the present disclosure. The scope of the present disclosure is to be determined by the appended claims.

What is claimed is:

1. A computing system for digital currency, comprising:
a plurality of computing devices each comprising a first port and a second port, a communication circuit, a parser and transceiver circuit, an operation circuit, and a local storage device, the plurality of computing devices comprising a first computing device and a second computing device; and
a signal transmission path connecting the plurality of computing devices in series, wherein each of the computing devices is respectively connected to the signal transmission path via the first port and the second port thereof,
wherein:
the communication circuit is respectively connected to the signal transmission path via the first port and the second port,
the parser and transceiver circuit are connected to the communication circuit and configured to receive a signal from the communication circuit, parse the received signal, and transmit a signal to the communication circuit, and provide at least the received signal, which is specific to an address of the computing device, to the local storage device thereof, the operation circuit is configured to perform an operation based on the received signal, which is specific to the address of the computing device, stored in the local storage device, the first computing device is configured not to provide a received signal, which is not specific to the address of the first computing device, to the local storage device thereof; and the second computing device is configured to receive, from the signal transmission path through one of the first port and the second port a signal to the local storage device thereof, and forward the signal, which is not specific to an address of the second computing device, or an adjusted version of the signal, which is not specific to an address of the second computing device, to the signal transmission path through one of the first port and the second port.

2. The computing system according to claim 1, wherein the second computing device is further configured to forward the signal which is not specific to the address of the second computing device or the adjusted version of the signal to the signal transmission path through the other of the first port and the second port.

3. The computing system according to claim 1, wherein the signal comprises an address, a read/write instruction, and data, wherein the first computing device and the second computing device are further configured to perform an operation on the data included in the received signal based on a same algorithm.

4. The computing system according to claim 1, wherein the first computing device and the second computing device comprise same components, and parts of the same components of the first computing device and the second computing device are differently configured.

5. The computing system according to claim 1, wherein the communication circuit of the second computing device comprises a forwarding circuit, and the forwarding circuit comprises:

a receiving circuit configured to receive the signal from the signal transmission path through the first port or the second port to a first register; and a transmitting circuit configured to acquire a signal stored in the first register or an adjusted version of the signal, and transmit the signal or the adjusted version of the signal to the signal transmission path through the second port or the first port.

6. The computing system according to claim 5, wherein the communication circuit further comprises a bypass path, and the bypass path is configured to:

bypass a signal received from the signal transmission path through one of the first port and the second port to the other of the first port and the second port without passing through the forwarding circuit.

7. The computing system according to claim 6, wherein the communication circuit further comprises:

a first multiplexer comprising a first input, a second input, and an output, wherein the first input is connected to the transmitting circuit, the second input is connected to the bypass path, and the output is connected to the second port; and a second multiplexer comprising a first input, a second input, and an output, wherein the first input is connected to the transmitting circuit, the second input is connected to the bypass path, and the output is connected to the first port.

8. The computing system according to claim 5, wherein the receiving circuit comprises:

a receiving logic circuit configured to receive a signal from the signal transmission path through one of the first port and the second port to the first register; and the first register; and the transmitting circuit comprises:

a second register configured to acquire and store the signal stored in the first register or the adjusted version of the signal stored in the first register; and a transmitting logic circuit configured to transmit the signal stored in the second register to the signal transmission path through one of the first port and the second port.

9. The computing system according to claim 5, wherein the first operation circuit and the second operation circuit perform an operation based on the same algorithm.

10. The computing system according to claim 1, wherein the communication circuit comprises:

a forwarding circuit comprising:

a receiving circuit configured to receive a signal from the signal transmission path through the first port or the second port to a first register; and a transmitting circuit configured to acquire a signal stored in the first register or an adjusted version of the signal stored in the first register, and transmit the signal or the adjusted version of the signal to the signal transmission path through the second port or the first port; and a bypass path configured to:

bypass a signal received from the signal transmission path through one of the first port and the second port to the other of the first port and the second port without passing through the forwarding circuit, wherein the first computing device is configured to cause the bypass path of the first computing device to operate and the forwarding circuit of the first computing device not to operate, and the second computing device is configured to selectively cause the bypass path of the second computing device or the forwarding circuit of the second computing device to operate.

11. The computing system according to claim 1, wherein each of the first port and the second port comprises one of the following: a UART interface, an I2C interface, and an SPI interface, and wherein the first computing device and the second computing device are chips or cores.

12. A computing device for digital currency, comprising:

a first port and a second port;

a communication circuit respectively connected to an external signal transmission path via the first port and the second port;

a local storage device;

a parser and transceiver circuit connected to the communication circuit and configured to receive a signal from the communication circuit, parse the received signal, and transmit a signal to the communication circuit, and provide at least the received signal, which is specific to an address of the computing device, to the local storage device, an operation circuit configured to perform an operation based on the received signal, which is specific to the address of the computing device, stored in the local storage device, wherein the computing device comprises a first operating mode and a second operating mode, in the first operating mode, the computing device is configured to receive, from the signal transmission path through one of the first port and the second port, a signal specific to an address of the computing device to a local storage device, and not to receive a signal not specific to the address of the computing device; and in the second operating mode, the computing device is configured to receive, from the signal transmission path through one of the first port and the second port to the local storage device, and forward the signal which is not specific to the address of the computing device or an adjusted version of the signal to the signal transmission path through one of the first port and the second port.

13. The computing device according to claim 12, wherein the communication circuit comprises:
- a forwarding circuit, comprising:
  - a receiving circuit configured to receive a signal from the signal transmission path through the first port or the second port to a first register; and
  - a transmitting circuit configured to acquire a signal stored in the first register or an adjusted version of the signal stored in the first register, and transmit the signal or the adjusted version of the signal to the signal transmission path through the second port or the first port; and
- a bypass path configured to:
  - bypass a signal received from the signal transmission path through one of the first port and the second port to the other of the first port and the second port without passing through the forwarding circuit, wherein in the first operating mode, the bypass path operates and the forwarding circuit does not operate, and in the second operating mode, the forwarding circuit operates and the bypass path does not operate.

14. The computing device according to claim 13, wherein the receiving circuit comprises:
- a receiving logic circuit configured to receive a signal from the signal transmission path through one of the first port and the second port to the first register; and
- the first register; and the transmitting circuit comprises:
- a second register configured to acquire and store the signal stored in the first register or the adjusted version of the signal stored in the first register; and
- a transmitting logic circuit configured to transmit the signal stored in the second register to the signal transmission path through one of the first port and the second port.

15. The computing device according to claim 14, wherein the communication circuit further comprises:
- a first multiplexer comprising a first input, a second input, and an output, wherein the first input is connected to the transmitting circuit, the second input is connected to the bypass path, and the output is connected to the second port; and
- a second multiplexer comprising a first input, a second input, and an output, wherein the first input is connected to the transmitting circuit, the second input is connected to the bypass path, and the output is connected to the first port.

16. The computing device according to claim 12, wherein the computing device is further configured to forward the signal not specific to the address of the computing device or the adjusted version of the signal to the signal transmission path through the other of the first port and the second port.

17. The computing device according to claim 12, wherein the signal comprises an address, a read/write instruction, and data, wherein the computing device is configured to perform an operation on data included in the received signal based on an algorithm for digital currency.

18. The computing device according to claim 12, wherein each of the first port and the second port comprises one of the following:
a UART interface, an I2C interface, and an SPI interface.

19. The computing device according to claim 12, wherein the computing device comprises a chip or a core.

* * * * *